United States Patent [19]

Kohno et al.

[11] Patent Number: 4,527,326
[45] Date of Patent: Jul. 9, 1985

[54] PART FEEDING AND ASSEMBLING SYSTEM

[75] Inventors: Michinaga Kohno, Tokyo; Koichi Sugimoto, Hiratsuka; Yasuo Nakagawa, Chigasaki, all of Japan

[73] Assignee: Hitachi, Ltd., Tokyo, Japan

[21] Appl. No.: 554,676

[22] Filed: Nov. 23, 1983

[30] Foreign Application Priority Data

Nov. 24, 1982 [JP] Japan ............................. 57-204641

[51] Int. Cl.³ ............................................. B23P 21/00
[52] U.S. Cl. ................................. 29/705; 29/709; 198/392; 198/444; 414/223; 414/730; 901/6; 901/7; 901/46; 901/47
[58] Field of Search .................. 29/705, 709, 712; 198/391, 392, 394, 395, 401, 444, 751, 757; 414/223, 226, 730, 735; 901/6, 7, 46, 47

[56] References Cited

U.S. PATENT DOCUMENTS

| 3,650,367 | 3/1972 | Mead | 198/391 X |
| 3,804,270 | 4/1974 | Michaud et al. | 901/47 X |
| 3,815,782 | 6/1974 | Miller | 198/392 X |
| 3,826,405 | 7/1974 | Hoppman et al. | 198/392 X |
| 3,881,605 | 5/1975 | Grossman | 198/395 X |
| 4,305,130 | 12/1981 | Kelley et al. | 901/6 X |
| 4,383,359 | 5/1983 | Suzuki et al. | 29/712 |
| 4,402,053 | 8/1983 | Kelley et al. | 414/730 X |
| 4,434,887 | 3/1984 | Yager | 198/391 |

FOREIGN PATENT DOCUMENTS

| 474435 | 9/1975 | U.S.S.R. | 901/6 |
| 704775 | 12/1979 | U.S.S.R. | 901/47 |
| 714354 | 2/1980 | U.S.S.R. | 901/47 |

OTHER PUBLICATIONS

Gleason, Gerald J., et al., "A Modular Vision System for Sensor-Controlled Manipulation and Inspection", Ninth International Symposium on Industrial Robots, Washington, D.C. (Mar. 13, 1979), pp. 57-70.

*Primary Examiner*—Ronald S. Wallace
*Attorney, Agent, or Firm*—Beall Law Offices

[57] ABSTRACT

A part feeding and assembling system comprises a bowl feeder composed of storage container for storing parts to be assembled and a transporting track for transporting the parts in a row, the transporting path having an end opened in the interior of the container, a visual recognition apparatus for imaging the parts being transported, determining whether the part as imaged is proper for assembling currently carried out, and recognizing position and direction of the proper part, and a robot for picking up the proper part by generating pick-up position data of the robot on the basis of the data representative of the position and direction of the proper part and assembling it to a part to be assembled at other station. The robot picks up only the proper part from those being transported. The bowl feeder introduces the improper parts to the container through the opening so that they are again placed on the transporting path for being recirculated.

5 Claims, 10 Drawing Figures

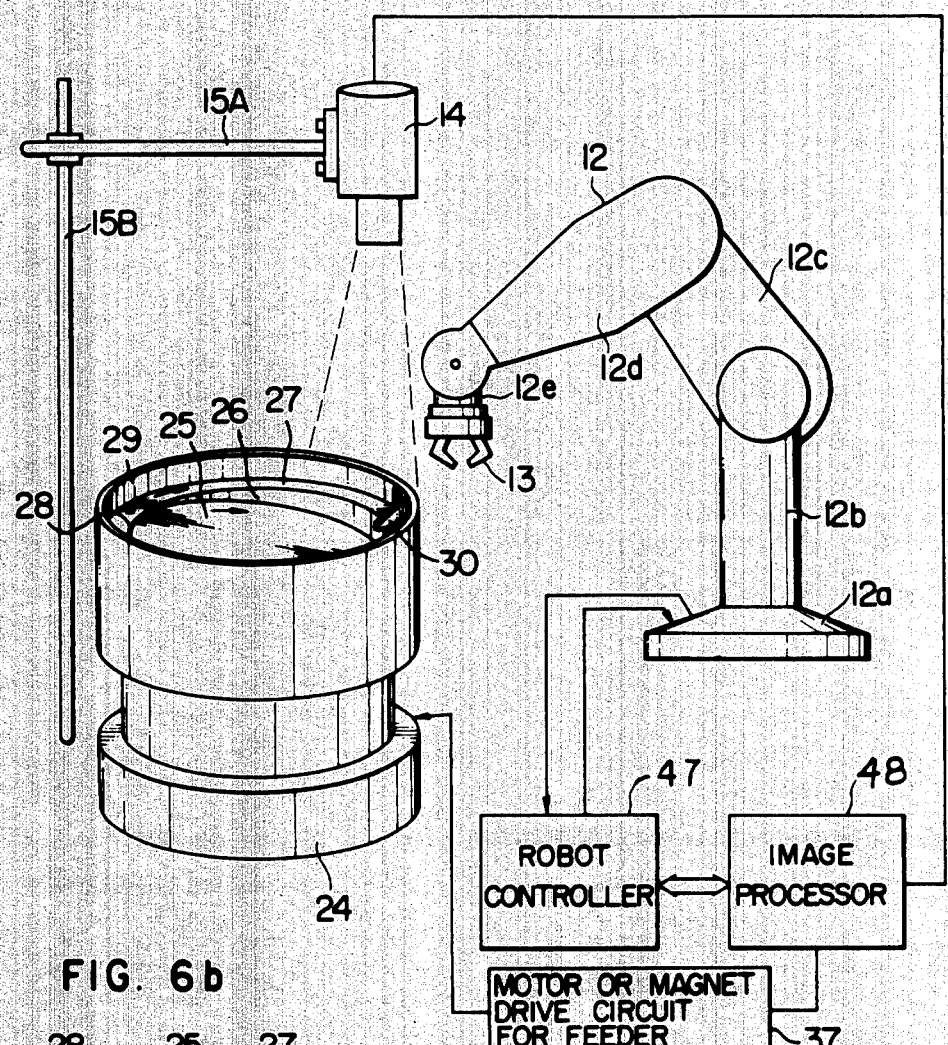
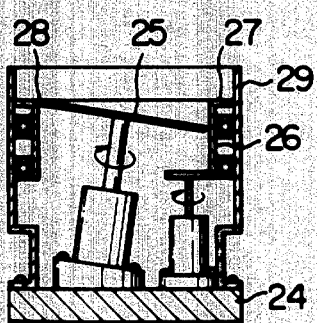
FIG. 6a
FIG. 6b

PART FEEDING AND ASSEMBLING SYSTEM

BACKGROUND OF THE INVENTION

The present invention relates to a part feeding and assembling system. More particularly, the invention concerns an assembling system which can be applied to the assembling of a great variety of parts.

In the recent years, industrial products tend to be manufactured in more and more multifariousness on a small batch production basis with the types or models of the products put on the market being changed from time to time. Under the circumstance, there arises demand for an assembling and manufacturing system which can offhand accommodate itself to such situation.

In the assembling and manufacturing line, a part feeding system provides a great obstacle to a full automation of the assembling process. For promoting the fully automated assembling process, the so-called universality of the part feeding system which can accommodate itself to all sorts of parts is indispensably required. Accordingly, there exists a great need for the development of such universal part feeding and assembling system.

In the hitherto known part feeding and assembling system such as, for example, disclosed in U.S. patent application Ser. No. 186,151 filed Sept. 10, 1980, now U.S. Pat. No. 4,383,359, issued May 17, 1983, a bowl 1 serving for storing parts is provided with a conveying or transporting track 2 for feeding the stored parts in a row, a chute 3 mounted at the outermost peripheral portion of the conveying track 2 in continuation thereto and a chute end portion 6 designed for holding the discharged part in correct position and attitude so that the part can be taken out by means of a handling mechanism, as is shown in FIG. 1 of the accompanying drawings.

In the part feeding system 8 mentioned above, the conveying or transporting track 2 is equipped with a wiper or baffle 4, a cutout 5 and others for the purpose of aligning the parts in a single layer in a row and allowing only the parts positioned in a prescribed attitude to be fed while those parts positioned in unwanted attitude are caused to drop in the bowl 1. Additionally, the chute 3 is provided with a part attitude sustaining member 7 for holding the parts selected and fed along the conveying track 2 in the attitude in which the parts are transported.

With the structure of the part feeding system described above, the wiper 4 and the cutout 5 provided on the conveying or transporting track 2 as well as the part attitude restricting member 7 mounted on the chute 3 have to be newly designed every time the configuration and dimensions of the parts are changed, making it impractical to adapt offhand the part feeding system to a great variety of the present-day manufacturing lines operated on the small batch production basis, providing a great obstacle to the promotion or realization of the fully automated manufacture.

As an improvement of the part feeding system described above, there has been proposed a structure of the part feeding system 8 in which the wiper and the cutout provided on the conveying or transporting track are replaced by optoelectric switches 9A, 9B and the like for detecting the attitude or orientation of the parts being fed along the track 2 to thereby discharge only those parts positioned in the wanted or prescribed attitude to the chute 3 while the other parts are blown off into the bowl 1 by means of an air nozzle 10, as is shown in FIG. 2. However, this type of part feeding system still requires the end portion 6 and part attitude sustaining member 7 for holding the parts discharged to the chute 3 in the attitude as it is. This means that the part attitude sustaining member 7 has to be altered in design when the shape and size of the part to be handled are changed, rendering the part feeding system inadaptable instantly to a variety of small batch production, to thereby cause a disadvantage.

As another approach for solving the above problem, it has been proposed that the parts are allowed to be discharged to the chute 3 without imposing any restriction on the parts in respect to the position and attitude, wherein the parts are picked up as the images with the aid of a television camera or the like to recognize the attitudes and positions of the parts by appropriately processing the image or video information thus obtained. The parts are then picked up by a handling mechanism such as an industrial robot whose operating position is varied or controlled on the basis of the results of the recognition processing. However, this system also suffers from such shortcoming that the parts which cannot be used must be manually returned to the bowl, making thus impossible the full automation.

SUMMARY OF THE INVENTION

It is an object of the present invention to provide a part feeding and assembling system which is substantially immune to the drawbacks of the hitherto known systems described above and which can accommodate itself offhand to a variety of small batch production systems while allowing the automatic part assembling line to be simplified.

In view of the above object, it is proposed according to an aspect of the invention that those portions or members which impose restrictions on the parts are omitted and that the conveying or feeding track is opened in the interior of a bowl so that the parts are circulated, wherein the proper parts are taken out in the course of the circulation. To this end, an end or terminal portion of the conveying track is opened into the interior of the storing bowl so that the stored parts fed out onto the conveying track are again introduced into the storing bowl from the end portion of the conveying track to thereby realize the circulation. Positions, attitudes and shapes of the parts being circulated or combinations thereof are detected by a detecting unit such as a television camera or the like. On the basis of information or signals derived from the detecting unit, it is determined by a decision means whether the position, attitude and shape of the part of combination thereof are proper or improper for the assembling currently carried out (the part having the proper position, attitude and shape or combination thereof will hereinafter be referred to as the proper part while the other being referred to as the improper part). In dependence on the result of decision made by the decision unit, only the proper part is picked up by means of a handling unit. On the other hand, the improper parts are introduced to the storing bowl by way of the opening provided at the end of the conveying or transporting track so that they can be again put on the transporting track to be circulated again in the manner mentioned above.

BRIEF DESCRIPTION OF THE DRAWINGS

FIGS. 3 to 5 show a part feeding and assembling system according to an exemplary embodiment of the invention, wherein:

FIG. 3 is a view showing schematically a general structure of the part feeding and assembling system;

FIG. 4 is a perspective view showing a bowl feeder of the system in detail; and

FIG. 6a shows schematically a general arrangement of a part feeding and assembling system according to another embodiment of the invention;

FIG. 6b is a sectional view showing another bowl feeder of the system;

FIG. 8 is a view showing schematically a general arrangement of a visual recognition apparatus which can be employed in the systems shown in FIGS. 3 and 6a.

DESCRIPTION OF THE PREFERRED EMBODIMENTS

Now, the invention will be described in conjunction with an examplary embodiment thereof shown in FIGS. 3 to 5.

Figure 1:
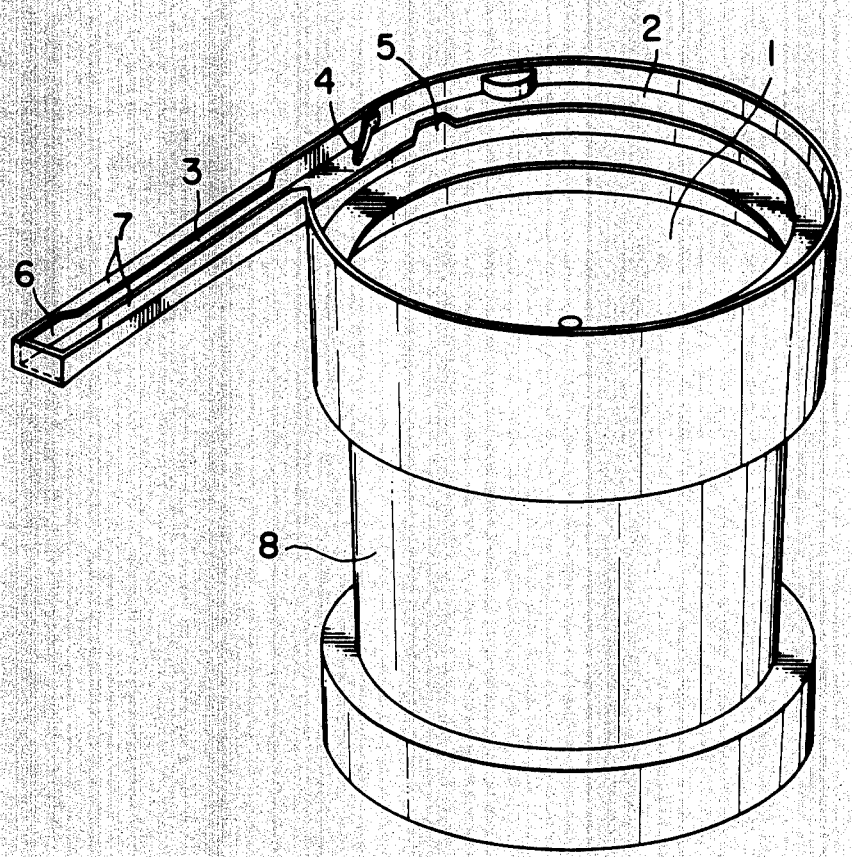
FIG. 1 shows in a perspective view a hitherto known part feeding system.
Figure 2:
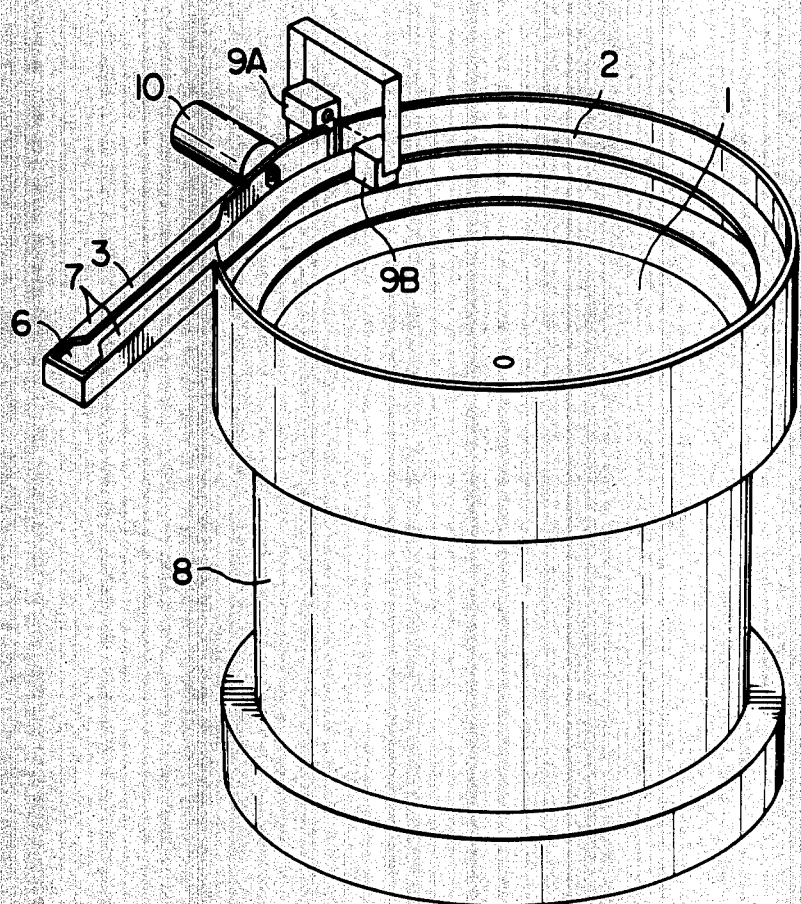
FIG. 2 shows in a perspective view another hitherto known part feeding system.
Figure 3:
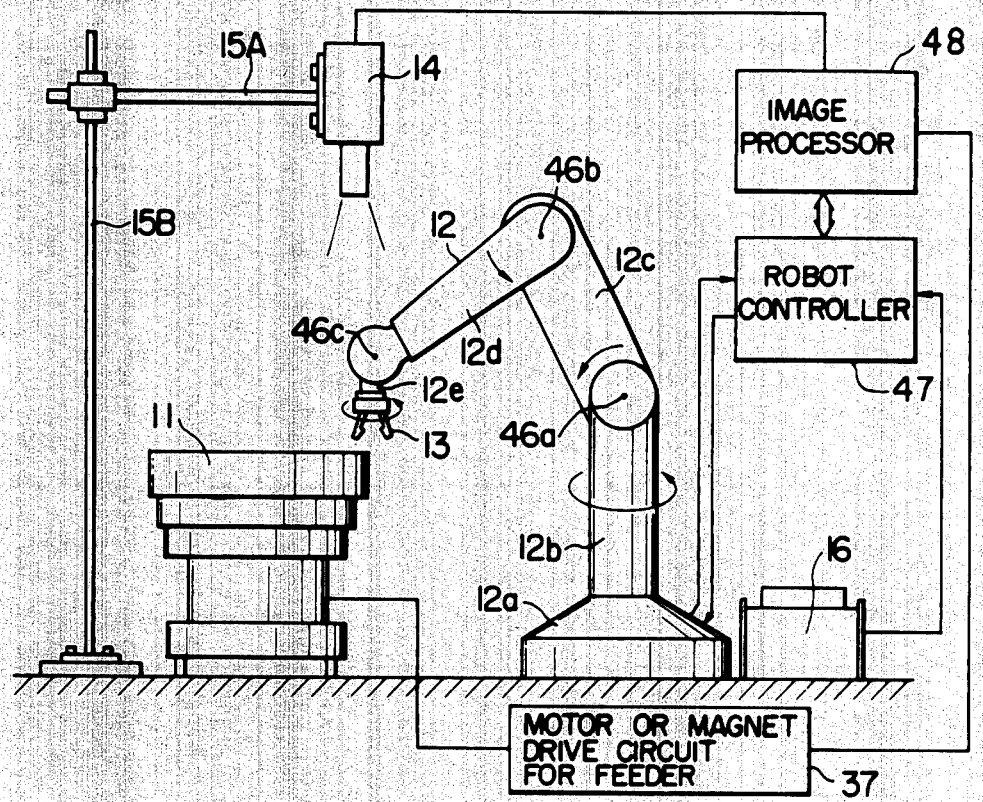

FIG. 3 shows a general arrangement of a part feeding and assembling system according to a first embodiment of the invention.

Describing briefly by referring to FIG. 3, the part feeding and assembling system comprises a bowl feeder unit 11 provided with a conveying or transporting track 18 having an end (terminal) portion 19 opened into the interior of a storage container 17 (refer to FIG. 4), a television camera 14 constituting a detecting unit for detecting parts 20A (FIG. 4) being fed, a decision unit (not shown) which may be constituted by a conventional unit available commercially and serve for discriminating the proper and improper parts from each other on the basis of information or signal obtained from the detecting unit or television camera 14, and a handling mechanism composed of a robot 12 and a gripper 13 for picking up only the proper parts on the basis of the result of decision made by the decision unit, wherein only the proper part is taken out from the row of parts 20A (FIG. 4) being conveyed along the track 18, while the improper parts are introduced into the storage container 17 from the opening 19 provided at the end of the conveying track 18 so as to be again placed on the conveying track 18 for recirculation. The television camera 14 and the decision unit constitute a visual recognition apparatus.

With the above outlined structure of the part feeding and assembling system, there arises no necessity for providing special means for sorting the proper parts from the improper on the way of the conveying track 18. The part feeding and assembling system is thus imparted with universality of application in respect to the shapes, sizes and others of the parts to be handled. Since only the proper parts are selected out from those being circulated through the system, the system can be fully automated and readily accommodate itself to a great variety of small batch production lines.

Describing in more detail the part feeding and assembling system by referring to FIG. 3, there is disposed above the bowl feeder unit 11 the detection unit which is constituted by the television camera 14 in the case of the embodiment being described. The television camera 14 is supported by stand members 15A and 15B and serves for monitoring the parts being transported. The robot 12 and the gripper mechanism 13 constitute a handling unit. The parts 20A being fed or conveyed are detected by the television camera 14 (constituting the detection unit), the detection output signal of the television camera 14 being supplied to the decision unit (not shown) where the proper and improper parts are discriminated from each other. On the basis of the result of decision made by the decision unit, the robot 12 and the gripper mechanism 13 are appropriately actuated so that only the proper parts are taken out. A reference numeral 16 denotes an assembling station.

Figure 4:
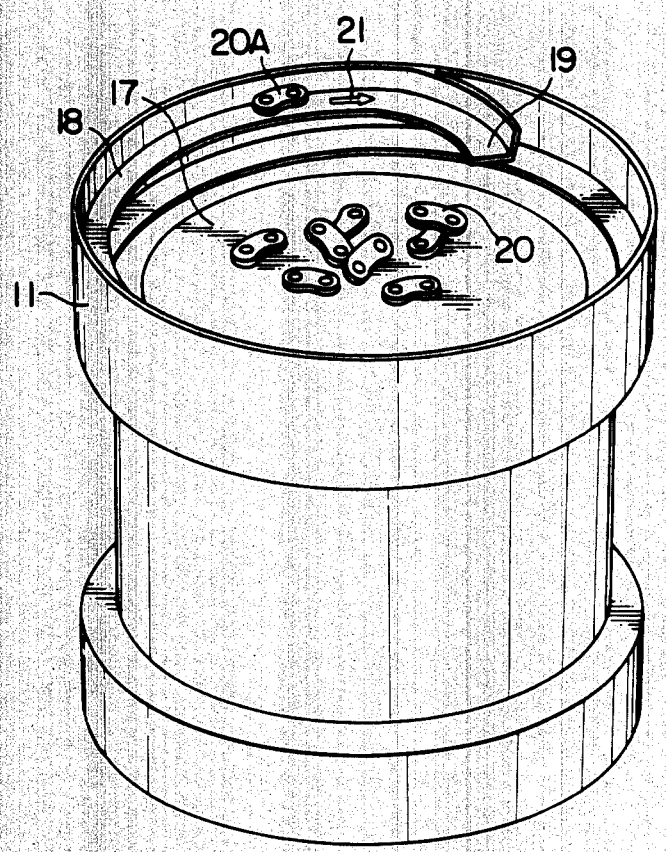

FIG. 4 shows in detail a structure of the bowl feeder unit 11. Referring to the figure, the inner peripheral surface of the feeder bowl 11 is provided with the conveying or transporting track 18 of a helical configuration. The end or terminal portion of the conveying track 18 is bent toward the interior of the feeder bowl 11 and opened therein. The storage container is denoted by 17, the parts stored in the container 17 are denoted by 20, while 20A denotes the parts being fed in the direction of arrow 21 on the conveying or transporting track 18.

Figure 5A:
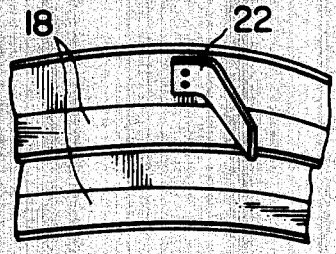
FIGS. 5a and 5b show, respectively, in partially enlarged views structures of a terminal end portion of a conveying or transporting track path.
Figure 5B:
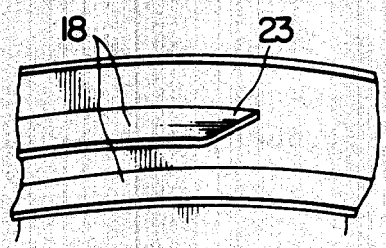

FIGS. 5a and 5b illustrate, respectively, other different structures of the termination of the conveying track 18. In the case of the structure shown in FIG. 5a, a wiper or a baffle 22 is provided at the end portion of the conveying track 18 so that the parts being fed are diverted by the wiper or a baffle 22 to drop into the storage container 17. On the other hand, in the structure shown in FIG. 5b, the conveying track 18 is simply terminated at 23 in such a manner that the parts being fed are caused to drop on the underlying turn of the track 18 or into the container 17.

FIGS. 6a and 6b show a part feeding and assembling system according to another embodiment of the invention. Referring to the figure, a numeral 24 denotes a rotating-type part feeder in which a rotatable disc 25 and an rotatable aligning track member 26 having respective axes of rotation inclined to each other are rotated in a same direction, as indicated by arrows. The parts placed on the rotating disc 25 are caused to move toward the aligning track member 26 under a centrifugal force produced due to rotation of the disc 25. At a transfer location 28 where the upper surface of the rotating disc 25 is flush with the transporting track surface 27 of the aligning track member 26, the parts are transferred onto the upper transporting track surface 27 and carried upwardly as the aligning track member 26 is rotated. A reference numeral 30 denotes a member corresponding to the wiper or baffle 22 shown in FIG. 5a and serves to cause the improper parts to fall on the rotating disc 25. A reference numeral 29 denotes an outer wall provided for preventing the parts from falling externally of the system. The television camera 14, the robot 12 and the gripper mechanism 13 are same as those described hereinbefore in conjunction with FIG. 3. Accordingly, repeated description will be unnecessary. It should be noted that the rotating-type part feeder described above generates no vibration for conveying the parts, thus enabling the vision system to obtain stable images of the parts on the transferring track in comparison with the aforementioned bowl feeder described in FIG. 3.

Next, description will be made of operation of the part feeding and assembling system of the arrangement described above.

The parts placed in the storage unit or container 17 are fed out on the transporting track 18. The part 20A thus transported drops into the container 17 from the end of the transporting track 19 so as to be again put on the transporting track 18.

In this way, the parts 20 stored in the storage unit or container 17 are circulated. The position, the attitude and/or the shape of the parts 20A being circulated is detected by the television camera or the like of the visual recognition unit, the detection signal output of which is inputted to the decision unit where it is decided whether the parts 20A are proper or improper in respect to the position, attitude, shape or combinations thereof. Discrimination or identification of the parts as well as detection of the position and attitude with the aid of the television camera 14 may be carried out by adopting, for example, a method disclosed in Gerald J. Gleason et al's article titled "A Modular Vision System for Sensor-Controlled Manipulation and Inspection Proc." of "9th Int. Sym. Ind. Robots" (Mar. 13-15, 1979 Washington). According to this method, a region of the part is extracted from an image through segmentation, wherein the center of gravity and the direction of the principal axis of moment (attitude) are obtained by determining the area of the extracted part region as well as first and second moments. Additionally, by calculating another ten or so characteristic parameters, it is possible to decide discriminatively the types of the parts. By adopting this method, the decision unit of the visual recognition apparatus can decide whether the parts 20A are proper or improper for the assembling in respect to the position, attitude, shapes or combinations thereof.

Only the parts that have been judged proper by the decision unit in this way are taken out through manipulation of the robot 12. To this end, the bowl feeder unit 11 may be temporarily stopped under the command from the decision unit of the visual recognition apparatus to thereby allow the proper part to be picked up through manipulation of the robot 12 or alternatively the bowl feeder unit 11 may be continuously rotated while the operation of the robot 12 is caused to follow the rotation of the proper part recognized by the visual recognition apparatus.

On the other hand, the robot 12 is not actuated for these parts which have been decided improper by the decision unit, whereby the improper parts are fed back to the storage or container 17 from the open end 19 of the transporting track 18.

In the foregoing description of the embodiments of the invention, it has been assumed that the television camera 14 is provided, wherein video signal produced by the television camera 14 is so processed as to be utilized for identifying discriminatively the proper and improper parts from each other by the decision unit whose output information provides the basis for actuating the robot 12. It should, however, be appreciated that the imaging of the parts may be effected by other suitable means than the television camera to the similar effect. Accordingly, the invention is never restricted to the use of the television camera.

Figure 8:
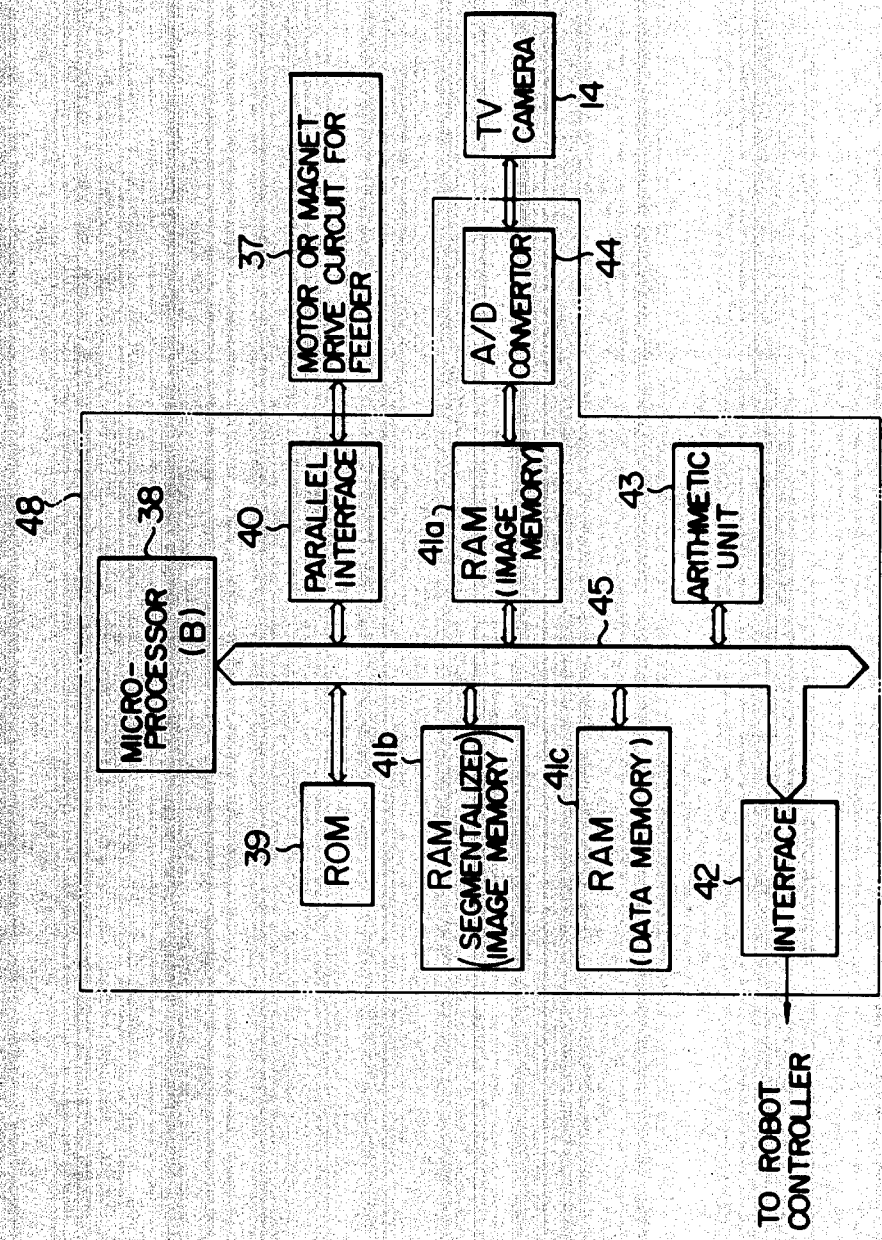

In more particular, the part feeding and assembling system according to the invention includes a robot system composed of the robot and the robot controlling unit 47, the visual recognition apparatus composed of the television or TV camera 14 and an image processor 48, and a motor or magnet drive circuit 37, as is shown in FIGS. 3 and 8.

Figure 7:
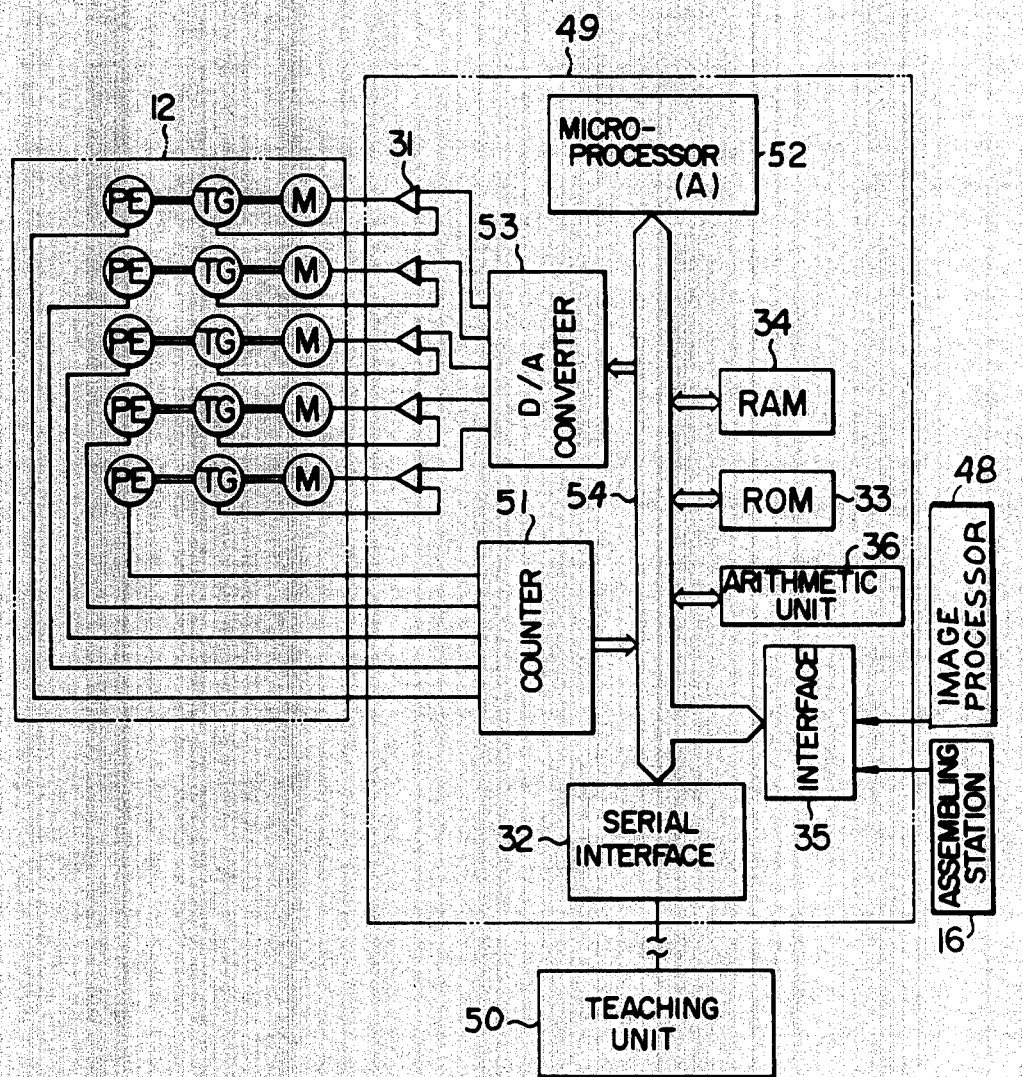
FIG. 7 is a view showing a general arrangement of a robot control apparatus which can be employed in the systems shown in FIGS. 3 and 6.

At first, the robot system will be described by referring to FIGS. 3 and 7. The robot 12 may be, for example, an industrial robot of articulated type having five degrees of freedom of motion. The industrial robot 12 is composed of a swivel base 12b rotatable about the vertical axis relative to the base 12a, an upper arm 12c rotatable about a horizontal axis 46a, a forearm 12d mounted on the free end portion of the upper arm 12c rotatably about a horizontal axis 46b, and a wrist 12e mounted on the free end of the forearm 12d rotatably about a horizontal axis 46c and an axis perpendicular to the latter. The wrist 12e is equipped with a hand mechanism 13 including fingers (chuck). The robot controller 47 includes a control unit 49 (FIG. 7) for controlling the articulated robot 12 having five degrees of freedom of motion, and a teaching unit 50 for teaching information or pre-programmed trajectory or path and speed to actuate or manipulate the robot along the predetermined path at the speed programmed on a point-to-point basis. The control unit 49 and the robot mechanism 12 constitute a position control system. Referring in particular to FIG. 7, the pulses generated by pulse encoders PE coupled to actuators M, respectively, are counted by a counter 51 whose output is fed back to the control unit 49 for detecting differences or deviations from predetermined desired or target values or desired coordinate values applied externally in terms of digital signals by means of a microprocessor (A) 52. The digital signals are converted into analog signals through a D/A converter 53 for driving the actuators M.

The drive circuits 31 are adapted to drive the actuators M on the basis of the speed signals generated by tachogenerators TG coupled to the respective actuators M and the analog signals produced by the D/A converter 53. A serial interface 32 serves for connection of the teaching unit 50. A ROM (read-only memory) 33 serves for storing programs prepared for operating/actuating the robot. A RAM (random access memory) 34 serves for storing information resulting from teaching process effected through the teaching unit 50 or information of the path of motion of the robot's hand mechanism 13 resulting from an interpolating arithmetic effected by an arithmetic unit 36 based on the information of operation inputted through an interface 35 from the image processer 48. A reference numeral 54 denotes a bus.

The position data of the robot's hand mechanism 13 stored in the RAM 34 are read out by the microprocessor 52 and converted through coordinate transformation into rotational or angular displacements $\theta_1, \theta_2, \ldots, \theta_5$ detected by the counter 51, to thereby drive the robot's hand mechanism 13 to a desired or target position (e.g. the position of the objective or aimed part inputted from the visual recognition apparatus). Further, in order to accomplish synchronism with the assembling station 16, a synchronising signal is inputted from the assembling station 16 through the interface 35.

The above description has been made on the assumption that the robot system has five degrees of freedom of motion. It should, however, be noted that the invention may equally be applied to other robot systems imparted with different degrees of freedom, e.g. six degrees of freedom. Thus, the invention is never restricted with respect to the degree of freedom of motion. Specifically, in the case of handling rotationally symmetrical parts such as gears and pulleys, a robot with three degrees of freedom may be effectively applied.

It should also be noted that, while the above description has been made on the assumption that the robot has an articulated structure, the invention may equally be applied to the other types of robots, e.g. robots with the rectolinear and cylindrical coordinates.

Next, the visual recognition system or apparatus which constitutes another important part of the invention will be described by referring to FIG. 8. An image or video signal produced by the TV camera 14 is converted into a digital signal through an A.D converter 44, whereby an image picked up by the TV camera 14 is stored in an image memory 41a constituted by a RAM. A microprocessor (B) 38 reads out the image information stored in the RAM 41a for comparing binary levels of individual picture elements (pixels) located adjacent to each other. When the comparison results in the same level, it is determined that the adjacent pixels represent continuity or connection. For discriminatively and separately identifying the individual connection regions, the relevant information is attached with predetermined labels and stored in a RAM 41b which may be referred to as the segmentalized image memory. More specifically, the microprocessor (B) 38 examines connections present in the pattern of binary information or levels of the picture elements to thereby segmentalize the pattern into pattern regions corresponding to the individual parts, respectively. Data of the segmentalized pattern regions are separately stored in the RAM 41b. For every segmentalized pattern region, i.e. region attached with the particular label, the microprocessor (B) 38 arithmetically determines the area, first moment and second moment with the aid of arithmetic unit 43 in accordance with the program stored in ROM 39, the results of the arithmetic operation being stored in a RAM 41c serving as the data memory. Further, the microprocessor (B) 38 determines with the aid of the arithmetic unit 43 the center of gravity and direction of the principal axis of moment (attitude) of the pattern region for every part on the basis of the data representative of the area, first moment and second moment stored in the RAM 41c, the results of the arithmetic operation being stored in the RAM 41c. At the same time, the microprocessor (B) 38 calculates with the aid of the arithmetic unit 43 the other ten or more characteristic parameters (e.g. length in the direction of long axis having the longest length, length in the direction of short axis having the shortest length, angles of inclination of the long axis and the short axis relative to the principal axis of moment) for thereby identifying the types or sorts of the parts. On the basis of the results of this identification, it is decided whether the part in concern is proper or improper for the assembling task subsequently carried out by the robot. When the decision results in that the part is proper, the microprocessor (B) 38 supplies a stop signal to the motor or magnet drive circuit 37 by way of the parallel I/F 40 to thereby stop the feeding of the parts by the feeder 11 or 24, whereupon the microprocessor (B) 38 newly fetches the image or video data from the TV camera and places them in the RAM 41a. The data corresponding to a single image stored in the RAM 41a are read out and segmentalized into the pattern regions corresponding to the parts, respectively, the segmentalized patterns are then stored in the RAM 41b. Subsequently, the center of gravity and the direction of the principal axis of moment of the pattern are determined for every part, the results of which are fed back to the robot controller 47 by way of the interface 42. In the robot controller, the microprocessor (A) 52 (FIG. 7) corrects the position coordinates in the horizontal direction and information of attitude in the horizontal direction stored in the RAM 34 with the values fed back as mentioned above, thereby controlling the robot 12 by way of the D/A converter 3. The robot grips the part, which has been decided proper and stands stationarily in the feeder, and transports it to the position of the objective being assembled at the assembling station 16. The decision as to whether the part is proper or improper may alternatively be made by comparing the center of gravity and the direction of the principal axis of moment of the pattern determined in the manner mentioned above with the center of gravity and direction of the principal axis of moment of a dictionary pattern. Further, profile of a pattern may be determined through approximation with several line segments. A reference numeral 45 denotes a bus.

As will be appreciated from the foregoing description, when a part being fed within the feeder is decided as the proper part for the intended assembling by the visual recognition apparatus, the robot picks up that part to be subsequently assembled. On the other hand, in case the part is decided improper, the part is returned to the storage of the feeder to be recirculated, since the latter is continuously operated. Accordingly, the part once decided improper can be ultimately decided as the proper part in the course of the assembling. In this way, several types of parts placed mixedly in the feeder can be sequentially and selectively picked up by the robot in the correct order of the assembling to be transported to the assembling station.

As will now be appreciated from the foregoing description, by virtue of the inventive arrangement such that the end of the part transporting track is opened in the interior of the storage container to thereby cause the parts to be circulated and that the parts being circulated are detected by the detecting unit whose output signal is made use of by the decision unit to determine whether the part is proper or improper for the assembling to thereby pick up only the proper parts, it is unnecessary to provide the special means for sorting the proper and improper parts from each other on the way of the transporting or conveying track. Further, since the terminal end of the transporting track is opened in the interior of the storage container or bowl so that the parts are circulated through the part feeding system, provision of the part attitude sustaining member as required in the hitherto known system is also rendered unnecessary. For this reason, the part feeding and assembling system according to the present invention can be applied to the handling of a great variety of parts and can thus enjoy the increased universality of application. In this way, the part feeding and assembling system according to the invention can be applied to a great variety of small batch production systems.

Besides, since plural kinds of the parts boarded mixedly in the part feeding and assembling system according to the invention are caused to circulate in the form of a row in which the different parts are aligned in a row in a random order, it is possible to detect, by the decision unit, and take out sequentially from the row the parts which are determined proper and necessary for the assembling carried out at that time. Accordingly, the single part feeding system of the invention allows a plurality of different parts to be supplied to the assembling station to thereby simplify the arrangement of the automatic assembling line. This is a great advantage over the hitherto known part feeding and assembling system where feeding or supply of a plurality of different parts to the assembling station requires a corresponding number of the part feeding stations.

We claim:

1. A part feeding and assembling system, comprising:
   (a) a bowl feeder composed of storage means for storing parts and a transporting track member for transporting the parts stored in the storage means in the form of at least a row, said transporting track member having a terminal end opening into the interior of said storage means;
   (b) visual recognition means for imaging the parts being transported on said transporting track member, determining whether a part as imaged is proper for assembling, and recognizing position and direction of the part determined to be proper; and
   (c) a robot for picking up the proper part recognized by said visual recognition means by generating pick-up position data of the robot on the basis of the data representing the position and direction of the proper part and assembling said proper part to a part to be assembled at another location;
   said robot taking out the part proper for the assembling from those being transported on said transporting track member, while said bowl feeder introduces a part determined improper for the assembling to said storage means through said opening formed at the end of said transporting track member so that said part is again placed on said transporting track member to be recirculated.

2. A part feeding and assembling system according to claim 1, wherein movement of the parts within said bowl feeder is stopped when said robot picks up the proper part.

3. A part feeding and assembling system according to claim 2, wherein said robot has at least three degrees of freedom of motion.

4. A part feeding and assembling system according to claim 1, wherein said visual recognition means is so arranged that patterns corresponding to the parts, respectively, are determined through segmentation of a picked-up image, to thereby determine the center of gravity and direction of the principal axis of moment for each of said segmentalized patterns.

5. A part feeding and assembling system according to claim 1, wherein said bowl feeder is formed of a rotating-type part feeder.

* * * * *